United States Patent
Yang et al.

(10) Patent No.: US 7,160,090 B2
(45) Date of Patent: Jan. 9, 2007

(54) TIRE MOLD WITH HELICALLY EXTENDING HEATING CONDUIT

(75) Inventors: Xiaofeng Shaw Yang, Mauldin, SC (US); Chris Kerechanin, Greer, SC (US)

(73) Assignee: Michelin Recherche et Technique S.A. (CH)

( * ) Notice: Subject to any disclaimer, the term of this patent is extended or adjusted under 35 U.S.C. 154(b) by 204 days.

(21) Appl. No.: 10/880,733

(22) Filed: Jun. 30, 2004

(65) Prior Publication Data
US 2005/0095308 A1    May 5, 2005

Related U.S. Application Data

(60) Provisional application No. 60/516,201, filed on Oct. 31, 2003.

(51) Int. Cl.
*B29C 35/02* (2006.01)

(52) U.S. Cl. .......................... 425/40; 249/79
(58) Field of Classification Search .............. 425/40; 249/79
See application file for complete search history.

(56) References Cited

U.S. PATENT DOCUMENTS

| | | | | |
|---|---|---|---|---|
| 1,582,714 | A | * | 4/1926 | Wells ........................ 249/79 |
| 1,630,113 | A | | 5/1927 | Mattia |
| 1,895,135 | A | * | 1/1933 | Rohn ......................... 249/79 |
| 1,917,262 | A | | 7/1933 | Hawkinson |
| 2,874,751 | A | | 2/1959 | Norton |
| 2,932,853 | A | * | 4/1960 | Fike ......................... 425/17 |
| 3,181,200 | A | | 5/1965 | Joseph |
| 3,633,656 | A | * | 1/1972 | Saunders ................... 249/79 |
| 3,868,203 | A | * | 2/1975 | Turk ......................... 425/40 |
| 4,116,595 | A | * | 9/1978 | Fike et al. ................. 425/40 |
| 4,141,531 | A | * | 2/1979 | Strausfeld ................. 249/79 |
| 4,184,823 | A | | 1/1980 | Williams |
| 4,515,541 | A | * | 5/1985 | Salvadori ................... 425/40 |
| 4,883,415 | A | * | 11/1989 | Salvadori ................... 425/47 |
| 5,759,587 | A | | 6/1998 | Naoi |
| 5,971,742 | A | | 10/1999 | McCollum et al. |
| 6,413,068 | B1 | | 7/2002 | Steidl et al. |
| 6,916,164 | B1 | * | 7/2005 | Kasper et al. ............. 425/46 |

(Continued)

FOREIGN PATENT DOCUMENTS

EP          0513348 A      11/1992

(Continued)

OTHER PUBLICATIONS

Patent abstracts of Japan vol. 1997, No. 07, Jul. 31, 1997.

*Primary Examiner*—James P. Mackey
(74) *Attorney, Agent, or Firm*—Dority & Manning, P.A.

(57) ABSTRACT

An apparatus for transferring heat into a product, such as a tire, formed at least in part by molding is provided. The apparatus includes a mold that has a central axis with a forming surface disposed radially outward from the central axis. A heating conduit is included and is at least partially located radially outward from the forming surface of the mold. The heating conduit is configured for use with a gas, such as saturated steam, in order to effect heat transfer to the forming surface of the mold. The heating conduit extends helically with respect to the central axis in order to allow condensation formed in the heating conduit to be drained therefrom via the force of gravity. A drainage connector may be in communication with the exit of the heating conduit and have a lower longitudinal axis than the heating conduit to allow condensation to drain more easily therefrom.

10 Claims, 6 Drawing Sheets

U.S. PATENT DOCUMENTS

2003/0111747 A1 * 6/2003 Chiu et al. .................... 249/79

FOREIGN PATENT DOCUMENTS

| | | | |
|---|---|---|---|
| EP | 1084811 A | | 3/2001 |
| EP | 1172198 A | | 1/2002 |
| JP | 9-76238 | * | 3/1997 |
| JP | 09076238 A | | 7/1997 |
| JP | 2002-160247 | * | 6/2002 |

* cited by examiner

TIRE MOLD WITH HELICALLY EXTENDING HEATING CONDUIT

PRIORITY CLAIM

This application claims the benefit of U.S. Provisional Application No. 60/516,201, filed Oct. 31, 2003 having the title "Tire Mold."

TECHNICAL FIELD OF THE INVENTION

The present invention relates generally to a heat transfer system for use with a mold. More particularly, the present invention relates to an apparatus for transferring heat into a tire intermediate using a helically extending conduit for the transfer of heat from steam.

BACKGROUND OF THE INVENTION

During tire production, a curing press is generally used during the manufacturing process to apply heat and pressure so as to cure a tire intermediate, referred to as a "green tire," and to engrave a tread pattern, sidewall markings, and other features onto the tire. A mold is typically incorporated into the curing press for receipt of the green tire and creation of these features. Typically, the green tire is subjected to the conditions of the press for a predetermined length of time at one or more predetermined temperatures.

Heat may be transferred to the tire mold to obtain the necessary temperatures by using heated platens or by placing the tire mold in a steam dome. A centrally located curing bladder may also be used into which hot water or steam is admitted causing heat to be transmitted into the tire and tire mold. A heat transfer member, such as a pipe, may also be used into which steam is admitted causing heat to be transferred from the steam to the tire mold.

FIG. 1 is a schematic view of a current tire press 32 that employs a heating conduit 20 arranged coaxial with a central axis 12 of tire mold 10. Heat from saturated steam 34 transferred through heating conduit 20 is used to heat tire mold 10. The circular portions of heating conduit 20 are placed into fluid communication with one another by way of intermittent sections 68. The phase change potential of saturated steam 34 provides both a significant amount of heat along with resulting condensation. Stagnant condensation 52 from steam 34 builds up in heating conduit 20 due to the substantially parallel orientation of heating conduit 20 with respect to the ground. Stagnant condensation 52 in heating conduit 20 reduces the efficiency of heat transfer into tire mold 10. More specifically, the overall heat transfer coefficient of mold 10 is substantially decreased by the presence of condensed steam—i.e. liquid—within heating conduit 20.

A drainage connector 24 is attached to heating conduit 20 in order to provide an outlet for the removal of stagnant condensation 52 from the system. Unfortunately, since the longitudinal axis 26 of drainage connector 24 is coaxial with the longitudinal axis 28 of heating conduit 20, the removal of stagnant condensation 52 is further hindered since stagnant condensation 52 will be allowed to sit via gravity on the bottom of heating conduit 20 and drainage connector 24.

THE SUMMARY OF THE INVENTION

Objects and advantages of the invention will be set forth in part in the following description, or may be obvious from the description, or may be learned through practice of the invention.

An apparatus for transferring heat into a product formed at least in part by molding is provided. The apparatus includes a heating conduit that extends helically with respect to a central axis of a horizontal mold in order to aid in the drainage of condensation formed when using saturated gas in the heating conduit in order to impart heat to the mold. Also provided is an apparatus as previously discussed that includes a drainage connector configured with the heating conduit with a longitudinal axis aligned below that of the heating conduit in order to more effectively drain condensation from and out of the heating conduit.

In one exemplary embodiment, the apparatus includes a horizontal mold that has a central axis and a forming surface disposed radially outward from the central axis. The heating conduit is at least partially located radially outward from the forming surface. The heating conduit is configured for use with the gas in order to effect heat transfer to the forming surface of the mold. The heating conduit extends helically with respect to the central axis in order to effectively drain condensation associated with the use of saturated gas. Although described as employing saturated gas, the apparatus of the present invention may be used with any type of gas in accordance with other exemplary embodiments.

The apparatus may be used to transfer heat into any type of product that is formed at least in part by molding. For instance, in one embodiment the product formed may be a tire. Here, the apparatus includes a horizontal tire mold that has a central axis with tread and sidewall surfaces disposed radially outward from the central axis. The heating conduit is at least partially located radially outward from the tread surface of the tire mold. The heating conduit is configured for the transport of steam therethrough in order to effect heat transfer to both the tread and sidewall surfaces of the tire mold. The heating conduit extends helically with respect to the central axis and is configured so that condensation formed in the heating conduit is at least partially drained via gravity therethrough.

In certain embodiments, a drainage connector is placed in fluid communication with the heating conduit. The longitudinal axis of the drainage connector is located below a longitudinal axis of a portion of the heating conduit proximate to the drainage connector. In this manner, the drainage connector and the heating conduit are configured to allow condensation in the heating conduit to drain through the drainage connector.

The heating conduit may be configured in a variety of manners in accordance with various exemplary embodiments. For instance, the heating conduit may be a channel located in the mold or located adjacent the mold. Alternatively, the heating conduit may be partially defined by the mold and partially defined by a helical strip in certain embodiments. The heating conduit may be oriented so as to have any degree of slope capable of allowing condensation in the heating conduit to drain therefrom. For instance, in one exemplary embodiment, the slope of the heating conduit with respect to a plane normal to the central axis is greater than 0.1°.

The horizontal mold may be placed into a press configured to apply compressive pressure to the mold in order to assist in the formation of the product. The heating conduit may be configured with the press, the mold, or both in accordance with various exemplary embodiments. The heating conduit may be configured to work with any type of steam. For instance, saturated steam may be transferred through the heating conduit in order to effect heat transfer to the forming surface of the mold.

In accordance with one exemplary embodiment of the present invention, an apparatus for transferring heat into a tire is provided and includes a horizontal tire mold with a central axis having tread and sidewall surfaces disposed radially outward therefrom. A heating conduit is at least partially located radially outward from the tread surface of the tire mold. The heating conduit is configured for the transport of steam therethrough in order to effect heat transfer to the tread and sidewall surfaces of the tire mold. The heating conduit extends helically with respect to the central axis and is configured so that condensation formed in the heating conduit is at least partially drained therefrom via gravity. The tire mold is divided into upper and lower mold sections so that the heating conduit is also divided into upper and lower heating conduit sections. A first drainage connector is placed in fluid communication with the upper heating conduit section. A longitudinal axis of the first drainage connector is located below a longitudinal axis of a portion of the upper heating conduit section proximate to the first drainage connector. This configuration allows condensation to drain from the upper heating conduit through the first drainage connector. Likewise, a second drainage connector is placed in fluid communication with the lower heating conduit section. A longitudinal axis of the second drainage connector is located below a longitudinal axis of a portion of the lower heating conduit proximate the second drainage connector. This configuration allows condensation to drain from the lower heating conduit through the second drainage connector.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

DETAILED DESCRIPTION

Figure 2:
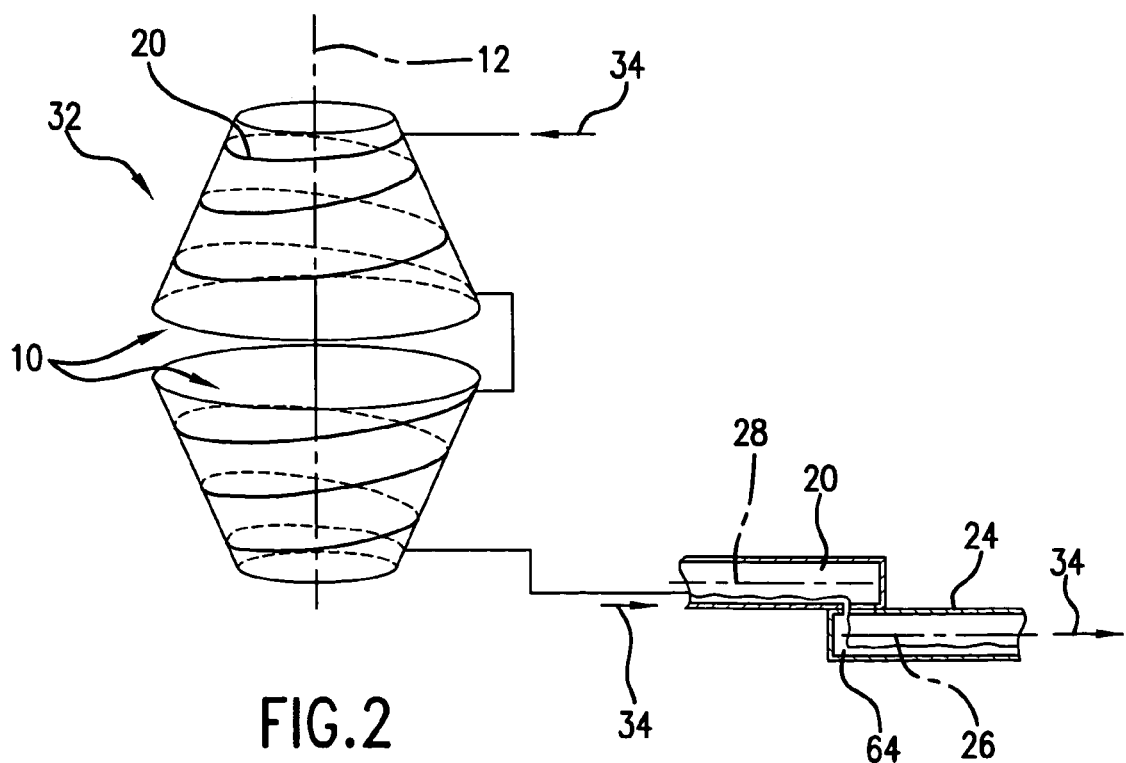
FIG. 2 is a schematic view of an exemplary embodiment of a tire press and tire mold in accordance with the present invention. Here, the heating conduit extends helically with respect to a central axis of the tire mold for assisting in the drainage of condensation formed in the heating conduit.

Illustrated in FIG. 2 is an exemplary embodiment of an apparatus for transferring heat into a tire that is formed, at least in part, by molding according to the present invention. In this instance, a horizontal tire press 32 with tire mold 10 is provided in conjunction with a heating conduit 20 that extends helically with respect to a central axis 12 of tire mold 10. A gas, such as steam 34, is admitted into heating conduit 20 in order to heat tire mold 10 and the product formed therein. Heat is provided as saturated steam 34 condenses into a liquid phase. The change from gas to liquid phase provides a significant amount of heat transfer to mold 10 but also forms condensation 64. From the standpoint of heat transfer efficiency, condensation 64 is undesirable because it substantially reduces the overall heat transfer coefficient of the system. In general, this undesirable but necessary effect increases as the amount of condensation within mold 10 increases during operation. In order to reduce the impact of condensation 64 on the heat transfer coefficient and resulting efficiency of heat transfer in the system, the helically extending configuration of heating conduit 20 allows condensation 64 to drain from mold 10 due to the effect of gravity. The drainage of condensation 64 from heating conduit 20 will thus eliminate or reduce the negative impact of the presence of condensation 64 on the heat transfer into tire mold 10 and tires formed therein. Additionally, a helically extending heating conduit 20 also provides for a more uniform temperature distribution in tire mold 10, which can result in improved manufacturability, improved product uniformity, lower manufacturing cost for tire products, and improved product quality.

A drainage connector 24 may also be provided in order to assist with the drainage of condensation 64. The longitudinal axis 26 of drainage connector 24 is deliberately misaligned with and located below the longitudinal axis 28 of an end portion of heating conduit 20 so that condensation 64 drains therefrom and may more easily be removed from the system. Drainage connector 24 therefore provides a low point below heating conduit 20 into which condensation 64 will be allowed to exit. The combination of heating conduit 20 and drainage connector 24 will allow condensation 64 to be drained through the use of gravity during heating of tire mold 10. The combination will also allow heat to be more efficiently transferred from steam 34 into heating conduit 20 directly through continued condensation on the walls of heating conduit 20 without the substantial build-up of condensation 64 in the system.

Figure 3:
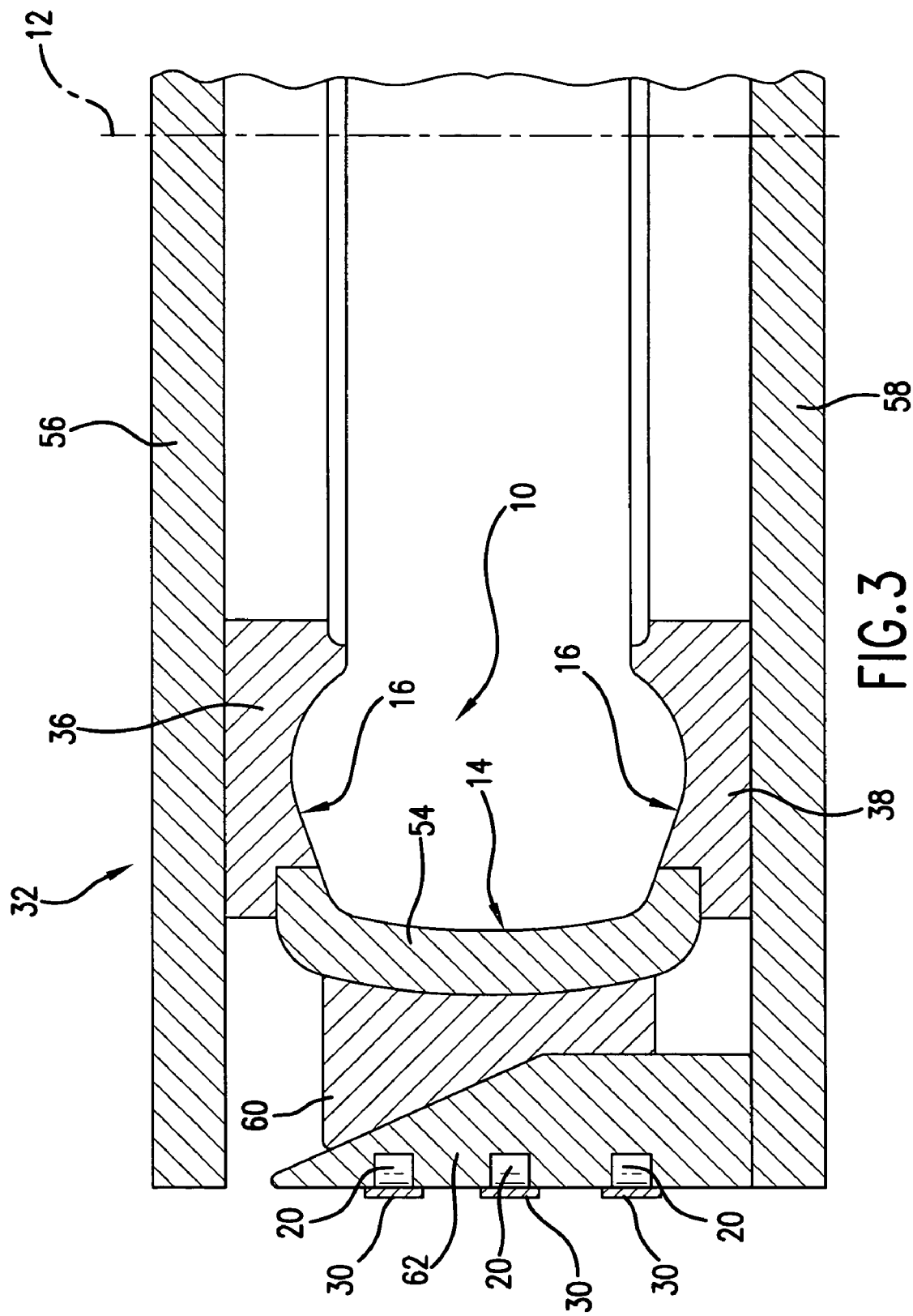
FIG. 3 is a cross-sectional view of an alternative exemplary embodiment of a tire press and tire mold in accordance with the present invention. A helically extending heating conduit is defined in a section of the tire press.

FIG. 3 is a cross-sectional view of a tire press 32 that may be used in accordance with one exemplary embodiment of the present invention. Tire press 32 includes tire mold 10 that has an upper mold section 36 disposed opposite from a lower mold section 38. Both upper and lower mold sections 36, 38 define a pair of sidewall surfaces 16 for use in forming the sidewall portions of a tire. Tire mold 10 further includes a central mold section 54 that defines a tread surface 14 for use in forming the tread portion on a green tire placed into tire press 32. Tire mold 10 may be made of any suitable material, for instance all or part of tire mold 10 may be constructed of aluminum. Tire press 32 provides a compressive or clamping force to tire mold 10 in order to assist in the manufacturing process of tires therein. Upper and lower press plates 56, 58 are arranged on either side of tire mold 10 and may be configured so as to be movable relative to one another. Both upper and lower press plates 56, 58 may be movable, or alternatively one may be stationary and the other movable so as to effect relative movement between the two plates 56, 58.

In the embodiment shown, upper press plate 56 is stationary and lower press plate 58, having angled back plate 62 disposed thereon, is movable in a direction along central axis 12. Vertical movement of lower press plate 58 will cause angled back plate 62 to move thus forcing radially movable segment 60 radially inward due to an inclined engagement between radially movable segment 60 and angled back plate 62. Radially inward movement of radially movable segment 60 will likewise cause central mold section 54 to move radially inward and exert pressure onto a green tire located in tire mold 10. Various components of tire press 32 may be configured so as to be movable in one or more directions, as is commonly known in the art, to provide any desired degree of pressure onto tire mold 10.

In the exemplary embodiment shown, heating conduit 20 is defined by angled back plate 62 and a helical strip 30. Heating conduit 20 extends helically downward with respect to central axis 12 so as to allow condensation 64 to drain therefrom through the force of gravity. Heat from steam 34 admitted into heating conduit 20 will be transferred through angled back plate 62, into radially movable segment 60, and into central mold section 54 and subsequently into a green tire located in tire mold 10. This heat may further be transferred into other portions of tire mold 10 such as upper and lower mold sections 36, 38 and into other portions of the green tire in tire mold 10. In other exemplary embodiments, upper and lower press plates 56, 58 may be provided with one or more heating elements if so desired in order to further provide heat into tire mold 10.

Heating conduit 20 may be variously configured in different embodiments. Although shown in FIG. 3 as being defined by angled back plate 62 and helical strip 30 and having a rectangular cross-section, heating conduit 20 may be a double walled pipe or may have various cross-sectional shapes such as square, rectangular, circular, trapezoidal, etc. Further, the cross-section of heating conduit 20 need not be uniform throughout its entire helically extended length. For example, heating conduit 20 may be made smaller in cross-sectional size so that heating conduit 20 is smaller at those portions of heating conduit 20 proximate to upper press plate 56 while heating conduit 20 is larger at those portions of heating conduit 20 proximate to lower press plate 58. Variations in the size, shape, or material making up heating conduit 20 allows for the achievement of a desired heat transfer into tire mold 10.

Figure 4:
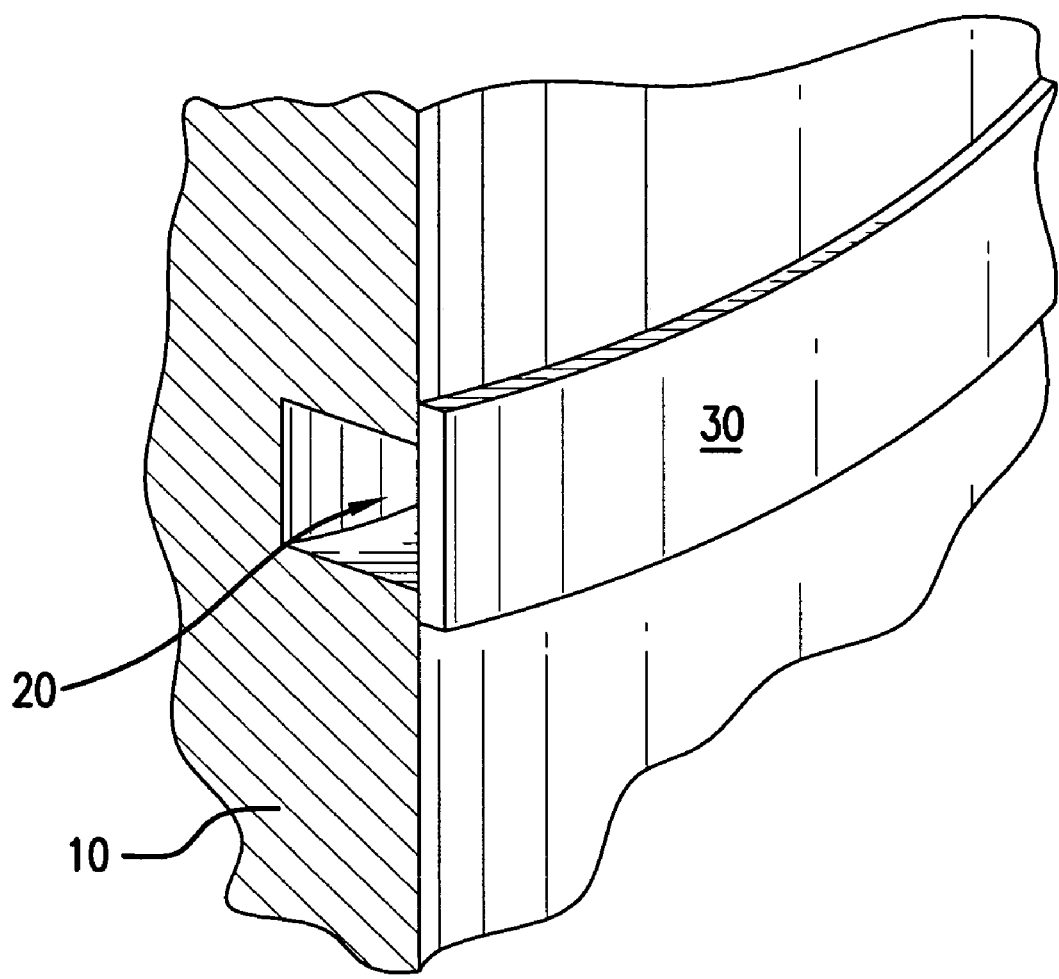
FIG. 4 is a perspective view of an alternative exemplary embodiment of the heating conduit in accordance with the present invention. The heating conduit is defined in part by the tire mold and in part by a helical strip.
Figure 5:
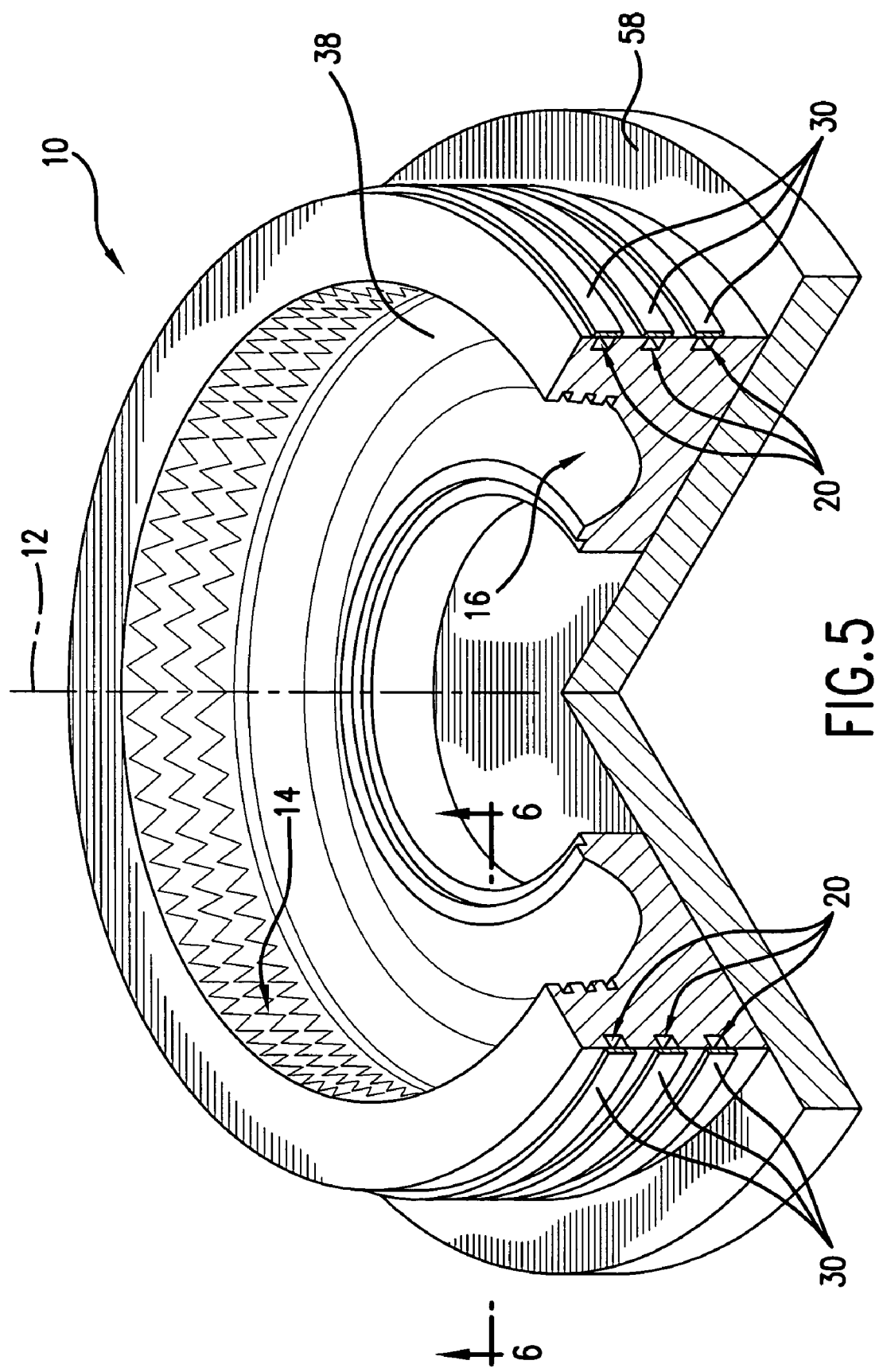
FIG. 5 is a perspective view of an alternative exemplary embodiment of a lower mold section of a tire mold that employs a helically extending heating conduit in accordance with the present invention.

FIG. 4 shows a further embodiment in which heating conduit 20 is constructed so as to have a square cross-sectional shape. Three sides of heating conduit 20 are defined by an end section of tire mold 10. The forth side of heating conduit 20 is made by a helical strip 30 that extends around tire mold 10 and is oriented so as to extend helically with respect to central axis 12. The entire length of heating conduit 20 may be configured as shown in FIG. 5, or alternatively the arrangement shown in FIG. 5 may make up two or three passes of heating conduit 20 around tire mold 10. In this instance, the rest of heating conduit 20 may be provided as a pipe or similar component. Helical strip 30 may be attached to tire mold 10 in any manner commonly known to one of ordinary skill in the art, for instance welding, adhesives, or mechanical fasteners may be used.

Figure 6:
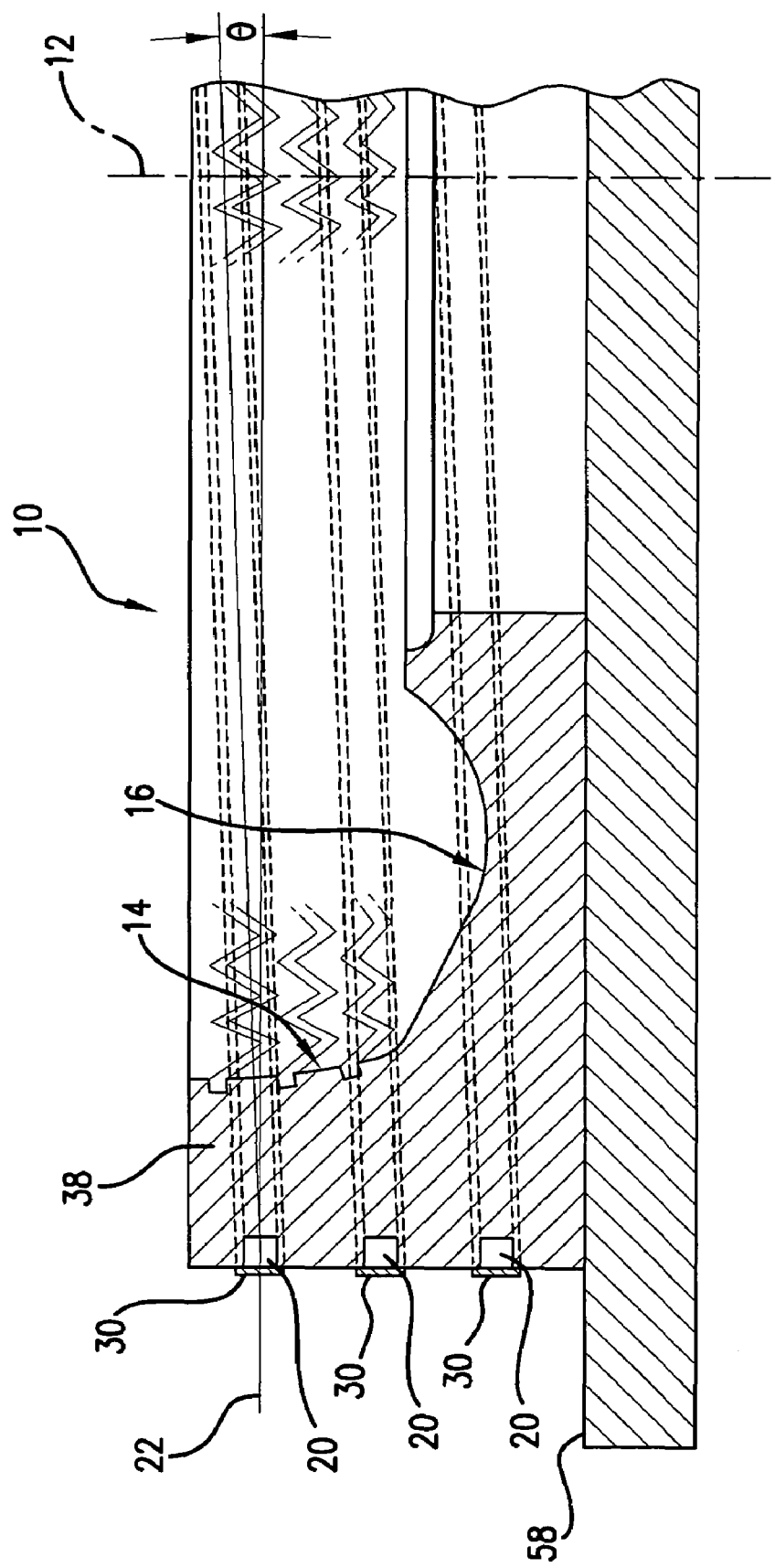
FIG. 6 is a cross-sectional view taken along line 6—6 of FIG. 5.

A further embodiment of tire mold 10 is shown in FIGS. 5 and 6. Here, tire mold 10 rests on lower press plate 58 and employs a heating conduit 20 that is formed by a helical strip 30 and lower mold section 38 and extends helically in the direction of central axis 12. Heating conduit 20 is inclined at an angle θ with respect to a plane 22 that is normal to central axis 12. Angle θ may be of any degree so as to allow condensation 64 to drain from heating conduit 20 via the force of gravity. Additionally, angle θ may be selected so as to ensure an appropriate length of heating conduit 20 is provided while condensation flow in heating conduit 20 is still adequate in order to ensure the correct heat transfer into tire mold 10. In this manner, should angle θ be too small, there may be the possibility of having a significant build up of condensation 64. An angle θ sized too large may result in having too short of a length, or amount of coils, of heating conduit 20. This situation may result in having insufficient heat transferred into tire mold 10 due to the limited internal area of heating conduit 20 present. In certain exemplary embodiments of the present invention, angle θ may be 0.5°, 0.75°, 1°, 2°, 5°, 7°, 10°, 15°, 20°, or 25°. In certain embodiments, angle θ may be any angle greater than 0.1°. Further, angle θ may vary in degree throughout the length of heating conduit 20. It is to be understood that any suitable angle θ may be employed in accordance with various exemplary embodiments of the present invention.

Figure 7:
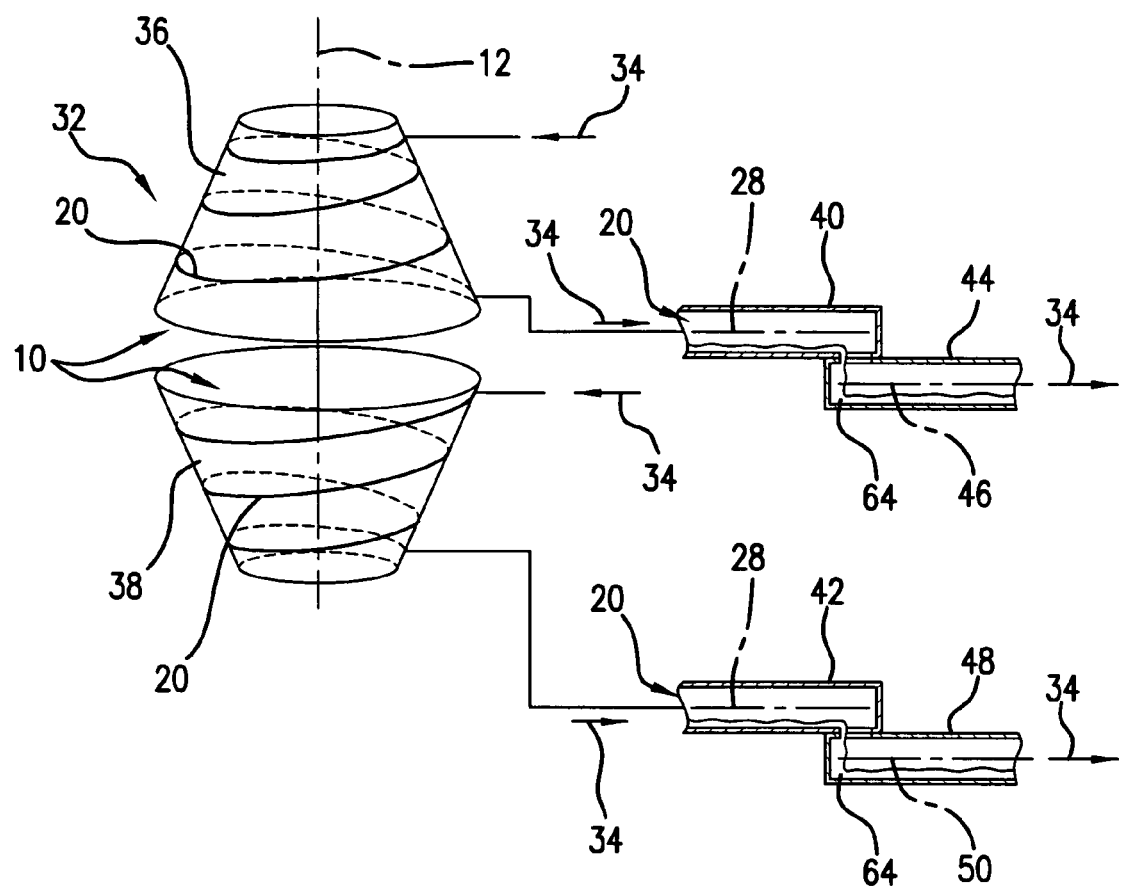
FIG. 7 is a schematic view of an alternative exemplary embodiment of a tire press and tire mold in accordance with the present invention. An upper heating conduit is connected on one end to a first drainage connector while a lower heating conduit is connected to a second drainage connector.

Tire mold 10 may also be configured so that more than one drainage connector 24 is present. FIG. 7 shows a schematic view similar to FIG. 2 in which tire press 32 includes tire mold 10 divided into both an upper mold section 36 and a lower mold section 38. Since upper and lower mold section 36, 38 split tire mold 10 at its mid-point, heating conduit 20 is also divided into an upper heating conduit section 40 incorporated into upper mold 36 and into a lower heating conduit section 42 incorporated into lower mold section 38. A first drainage connector 44 is attached to the outlet end of upper heating conduit section 40. First drainage connector 44 has a longitudinal axis 46 that is misaligned with and located below the longitudinal axis 28 of the end portion of upper heating conduit section 40. Although shown completely below upper heating conduit section 40, first drainage connector 44 may be arranged so that longitudinal axis 46 and longitudinal axis 28 are closer to, yet not touching one another. This type of arrangement will still provide for a low point into which condensation 64 may drain from upper heating conduit section 40.

A second drainage connector 48 may be arranged with lower heating conduit section 42 in the same manner as previously discussed with respect to first drainage connector 44 and upper heating conduit section 40. Once again, the longitudinal axis 50 of second drainage connector 48 is positioned below the longitudinal axis 28 of the end portion of lower heating conduit section 42. Although shown as a pair of drainage connectors 44, 48 it is to be understood that any number of drainage connectors may be used in accordance with various exemplary embodiments of the present invention.

Drainage connectors 44, 48 may be attached to the heating conduit sections 40, 42 by any method commonly known in the art. For instance, these components may be integrally formed with one another, may be attached through welding, adhesives, mechanical fasteners, pins, bolts, or any other suitable method. Drainage connectors 44, 48 may be permanently attached to heating conduit sections 40, 42 or may be configured so as to be removably attached thereto. Steam 34 may be introduced into heating conduit 20 through an inlet (not shown). Although described as being used with a horizontal tire mold 10, the present invention may be employed in tire molds that are vertical or oriented at various angles.

Figure 1:
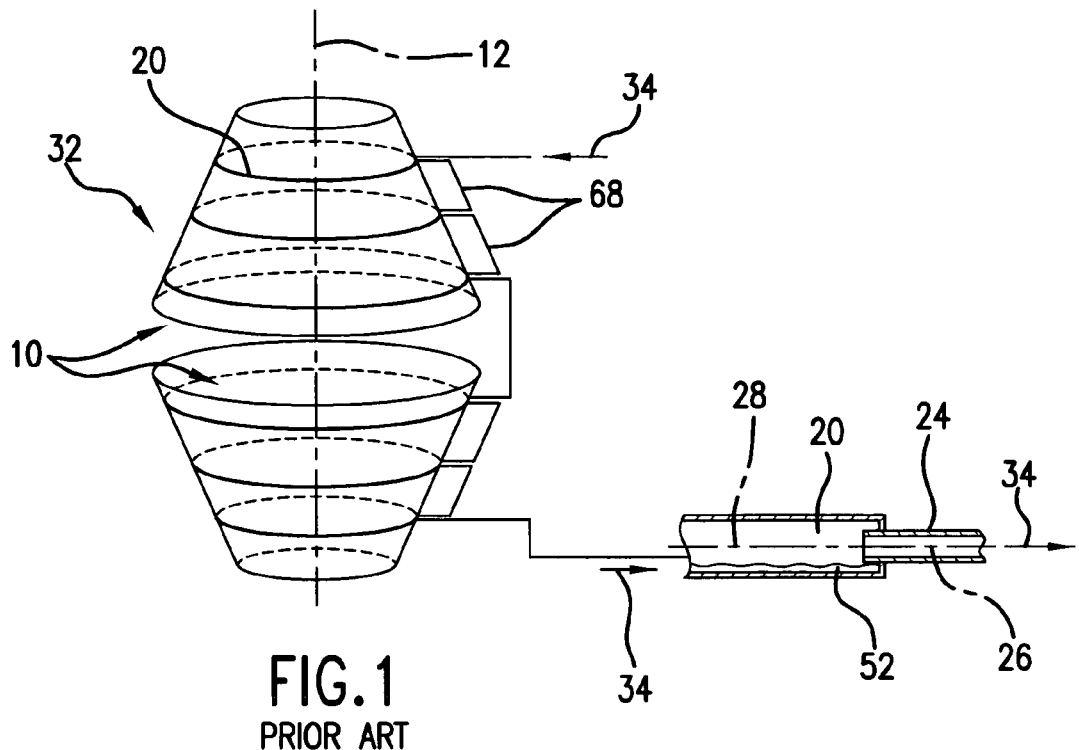
FIG. 1 is a schematic view of a conventional tire press for use with a tire mold that employs a heating conduit oriented normal to a central axis of the tire mold.

It should be appreciated by those skilled in the art that modifications and variations can be made to the apparatus as described herein, without departing from the scope and spirit of the claims. It is intended that the invention includes such modifications and variations as come within the scope of the appended claims and their equivalents.

EXPERIMENT CARRIED OUT TO DEMONSTRATE EFFECTIVENESS OF A HELICALLY EXTENDING HEATING CONDUIT An experiment was conducted in order to demonstrate the heat transfer effectiveness of the design disclosed in the present application. A conventional tire mold 10 was employed, such as one used in the tire press 32 of FIG. 1, that included a series of parallel heating conduits 20. Using this conventional tire mold 10 in a horizontal position as shown in FIG. 1, a predetermined location within the tire was heated from ambient to 120° C. in approximately 110 minutes by the use of 150° C. steam 34. The conventional tire mold 10 was then turned on its side so as to be rotated 90°. Therefore, instead of being parallel to the ground or horizontal, heating conduit 20 extended up and down with respect to the ground. The mold was positioned so that the same predetermined location where temperature was measured for horizontal operation was now located at the top of the mold 10. In this position, condensation 64 would not accumulate in the heating conduit 20 at positions near the predetermined location but instead would be drained by gravity to the portions of heating conduit 20 closer to the ground. A time of less than 80 minutes was needed in order to heat the same predetermined location from a temperature of ambient to 120° C. This represented a substantial improvement in heating time as compared to when conventional tire mold 10 was oriented in the previous, horizontal position depicted in FIG. 1.

What is claimed is:

1. An apparatus for transferring heat into a tire, comprising:
    a tire mold having a central axis and having tread and sidewall surfaces disposed radially outward from the central axis;
    a heating conduit at least partially located radially outward from the tread surface of the tire mold, the heating conduit configured for the transport of gas therethrough in order to effect heat transfer to the tread and sidewall surfaces of the tire mold, wherein the heating conduit extends helically with respect to the central axis and is configured such that condensation formed in the heating conduit is at least partially drained via gravity therethrough; and
    a drainage connector in fluid communication with the heating conduit, wherein a longitudinal axis of the drainage connector is located below a longitudinal axis of a portion of the heating conduit proximate the drainage connector such that the drainage connector and heating conduit are configured to allow condensation to drain from the heating conduit through the drainage connector.

2. The apparatus as set forth in claim 1, wherein the heating conduit is a channel located adjacent the tire mold.

3. The apparatus as set forth in claim 1, wherein the heating conduit is a channel located in the tire mold.

4. An apparatus for transferring heat into a tire, comprising:
    a tire mold having a central axis and having tread and sidewall surfaces disposed radially outward from the central axis; and
    a heating conduit at least partially located radially outward from the tread surface of the tire mold, the heating conduit configured for the transport of gas therethrough in order to effect heat transfer to the tread and sidewall surfaces of the tire mold, wherein the heating conduit extends helically with respect to the central axis and is configured such that condensation formed in the heating conduit is at least partially drained via gravity therethrough;
    wherein the heating conduit is defined by the tire mold and a helical strip.

5. An apparatus for transferring heat into a product formed at least in part by molding, comprising:
    a mold having a central axis and having a forming surface disposed radially outward from the central axis;
    a heating conduit at least partially located radially outward from the forming surface of the mold, the heating conduit configured for use with gas in order to effect heat transfer to the forming surface of the mold, wherein the heating conduit extends helically with respect to the central axis; and
    a drainage connector in fluid communication with the heating conduit, wherein a longitudinal axis of the drainage connector is located below a longitudinal axis of a portion of the heating conduit proximate the drainage connector such that the drainage connector and heating conduit are configured to allow condensation to drain from the heating conduit through the drainage connector.

6. The apparatus as set forth in claim 5, wherein the heating conduit is a channel located adjacent the mold.

7. The apparatus as set forth in claim 5, wherein the heating conduit is a channel located in the mold.

8. The apparatus as set forth in claim 5, wherein the heating conduit is partially defined by the mold and partially defined by a helical strip.

9. An apparatus for transferring heat into a tire, comprising:
    a tire mold having a central axis and having tread and sidewall surfaces disposed radially outward from the central axis;
    a heating conduit at least partially located radially outward from the tread surface of the tire mold, the heating conduit configured for the transport of steam therethrough in order to effect heat transfer to the tread and sidewall surfaces of the tire mold, wherein the heating conduit extends helically with respect to the central axis and is configured such that condensation formed in the heating conduit is at least partially drained via gravity therethrough;
    wherein the tire mold is divided into upper and lower mold sections such that the heating conduit is also divided into upper and lower heating conduit sections;
    a first drainage connector in fluid communication with the upper heating conduit section, wherein a longitudinal axis of the first drainage connector is located below a longitudinal axis of a portion of the upper heating conduit section proximate the first drainage connector such that the first drainage connector and upper heating conduit section are configured to allow condensation to drain from the upper heating conduit section through the first drainage connector; and a second drainage connector in fluid communication with the lower heating conduit section, wherein a longitudinal axis of the second drainage connector is located below a longitudinal axis of a portion of the lower heating conduit section proximate the second drainage connector such that the second drainage connector and lower heating conduit section are configured to allow condensation to drain from the lower heating conduit section through the second drainage connector.

10. An apparatus for transferring heat into a tire, comprising:
   a tire mold having a central axis and having tread and sidewall surfaces disposed radially outward from the central axis;
   a heating conduit at least partially located radially outward from the tread surface of the tire mold, the heating conduit configured for the transport of steam therethrough in order to effect heat transfer to the tread and sidewall surfaces of the tire mold, wherein the heating conduit extends helically with respect to the central axis and is configured such that condensation formed in the heating conduit is at least partially drained via gravity therethrough;
   wherein the tire mold is divided into upper and lower mold sections such that the heating conduit is also divided into upper and lower heating conduit sections that are in fluid communication with one another; and
   a drainage connector in fluid communication with the lower heating conduit section, wherein a longitudinal axis of the drainage connector is located below a longitudinal axis of a portion of the lower heating conduit section proximate the drainage connector such that the drainage connector and lower heating conduit section are configured to allow condensation to drain from the lower heating conduit section through the drainage connector.

* * * * *